May 14, 1968

F. B. POWELL 3,382,701

RUG TESTER

Filed March 10, 1966

INVENTOR.
FRED B. POWELL
BY George P Chandler
ATTORNEY

May 14, 1968  F. B. POWELL  3,382,701
RUG TESTER

Filed March 10, 1966 4 Sheets-Sheet 2

INVENTOR.
FRED B. POWELL
BY *George P. Chandler*
ATTORNEY

May 14, 1968  F. B. POWELL  3,382,701
RUG TESTER
Filed March 10, 1966  4 Sheets-Sheet 3
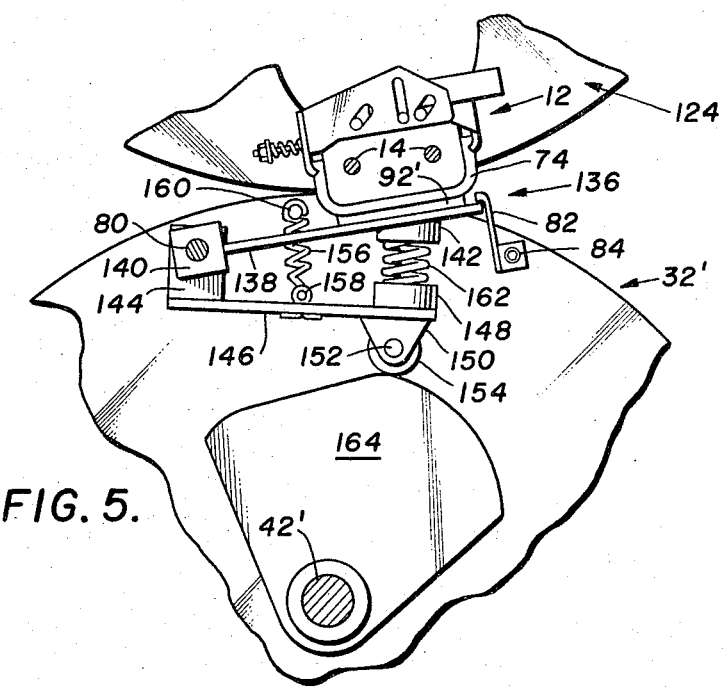
INVENTOR.
FRED B. POWELL
BY George P Chandler
ATTORNEY

INVENTOR.
FRED B. POWELL
BY
ATTORNEY

United States Patent Office 3,382,701
Patented May 14, 1968

3,382,701
RUG TESTER
Fred B. Powell, Decatur, Ala., assignor to Monsanto
Company, St. Louis, Mo., a corporation of Delaware
Filed Mar. 10, 1966, Ser. No. 533,311
10 Claims. (Cl. 73—7)

ABSTRACT OF THE DISCLOSURE

An apparatus for longevity testing of a carpet wherein a pressure pad carried along a path engages a carpet sample carried along another path to simulate the action of a foot on a stair edge. The mechanism supporting the carpet sample is arranged to provide the appropriate impact, sliding and rolling forces to the carpet sample as it engages the pressure pad.

---

This invention relates to apparatus for testing the wear characteristics of a surface covering. More particularly, this invention relates to a device which simulates the force, slip, and roll forces to which a carpet installed on a stair step is subjected.

In order to determine the optimum characteristics of a carpet to be utilized in a particular application, it is necessary to subject it to testing in an environment which duplicates as closely as possible that which is found under actual usage conditions. This duplication may be performed either artificially by the use of testing devices or by placing a carpet sample into the desired environment. The latter solution is very time consuming and is, for this reason, unsatisfactory where it is desired to develop and place a product on the market as quickly as possible.

Since the amount of testing time available is usually limited the simulation of an environment by the use of testing machines is normally the only practical answer. Testing machines have been developed which reproduce impact and abrasion to some degree. The forces to which the carpet is subjected when it is to be utilized on a stairway are, however, very complex and have not heretofore been satisfactorily duplicated.

It has been found that the greatest wear point on a carpet or other surface covering installed on a stairway occurs along the edges of the individual steps. This occurs during the heavy contact of a foot as it rolls over the edge during descent of a stairway. Some of the forces to which a carpet is subjected in this environment are a gradually increasing impact accompanied by abrasion as the foot slides acros the covering, and a roll across the stair edge, and decreasing impact pressure as the foot leaves a particular step. The device of the instant invention has been constructed to provide for simulation of these forces an accomplishment which has not been achieved in existing carpet testers.

The tester consists of a plurality of sample blocks mounted on a rotatable sample wheel, and a number of foot assemblies pivotally mounted on a rotating foot wheel to act, in combination, to stress the surface covering and simulate wear thereon. The two wheels turn in synchronism and are placed proximate one another so that the sample and the foot meet as their positions rotate. In one embodiment of the invention a cam is formed on the pivotally mounted foot assembly and is acted upon by a cam follower secured to the axle of the foot wheel and resiliently biased into contact with the cam by a spring. In another embodiment of the invention the follower is located on the foot assembly and is resiliently biased toward a cam secured to the axle of the foot wheel. In both of the afore-described embodiments, the cam is contoured to simulate the pressure applied to a stair step surface covering by a human foot. Furthermore, in both embodiments, the sample blocks at their outermost extent are radially spaced at a greater distance from the axle of the sample wheel than the radial distance from the axle of the foot wheel to the foot assemblies. Thus, while the angular velocity of the foot assembly and the sample blocks are substantially equal, the linear velocity of the sample block exceeds that of the foot assembly. As these two elements come into contact, therefore, the block and its surface covering sample will slide across the foot assembly, further simulating a force to which the carpet on a step is subjected.

In the preferred form of the invention the number of sample blocks exceeds the number of foot assemblies by at least one so that each sample will be subjected to each foot assembly in turn. By utilizing a ratio other than one sample to one foot variations which may occur from foot assembly to foot assembly and sample blocks to sample blocks are minimized. The number of foot assemblies and sample blocks is equal in another embodiment of the invention so that the same foot assembly and sample always contact one another.

Accordingly, it is an object of this invention to provide a mechanical floor covering tester which will simulate the forces produced by the shoe of a person descending a stair.

Another object of this invention is to provide a mechanical carpet tester which will simulate the impact, sliding, and roll forces to which a stair step covering is subjected.

Yet another object of this invention is to duplicate the environment and conditions to which a surface covering, particularly a carpet, is subjected when installed on a stairway.

A still further object of this invention is to provide a mechanical tester for reproducing the wear pattern caused by traffic on a stairway.

These and other objects and advantages of this invention will be more apparent upon reference to the following specification, appended claims, and drawing wherein:

FIGURE 5 is a view similar to FIGURE 4 but showing details of the sample block-foot assembly relationship according to the invention as illustrated in FIGURE 3;

FIGURE 6 is a plane view of the sample holding block according to the instant invention;

FIGURE 7 is a side elevational view of the sample block of FIGURE 6;

In order to better understand the construction and use of this novel testing device, it will be described in relation to its use for simulating a condition which a carpet encounters when installed on a stair step. It is to be understood, however, that various other uses may be found for this novel apparatus. For example, it could be utilized to test other surface coverings such as linoleum, tile, asphalt, concrete, wood, and others. Furthermore, the apparatus may be used to simulate conditions wherever impact, slide, and roll forces exist. Other uses will be readily apparent to those skilled in the art.

Figures 1, 2:
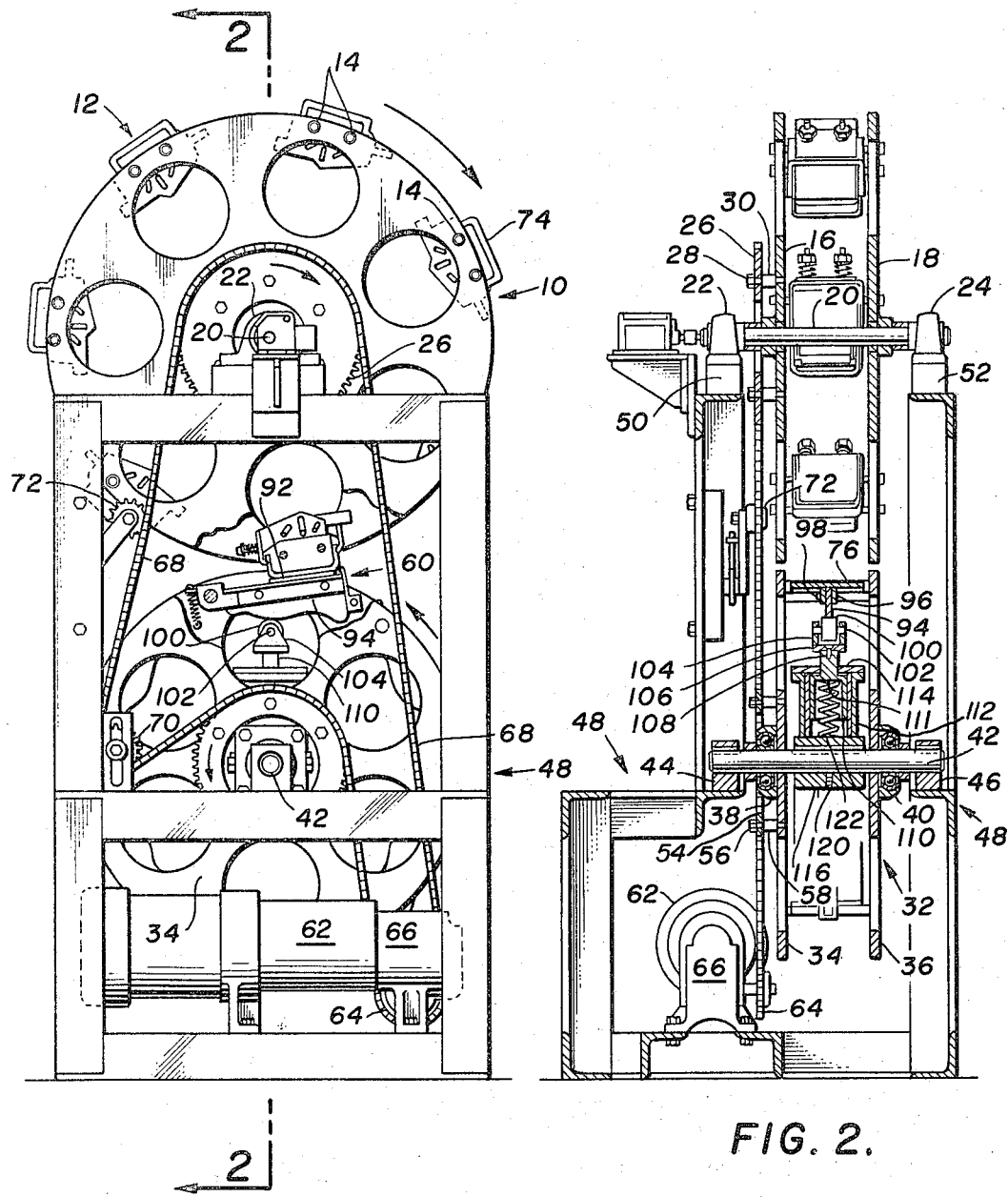
FIGURE 1 is a side view of the mechanical tester according to one embodiment of the invention showing the relationship between the sample blocks and the foot assemblies, the drive mechanism, and the foot and sample wheels.
FIGURE 2 is a partly sectional view taken along line 2—2 of FIGURE 1 showing in more detail the cam and cam follower arrangement according to one embodiment of the invention.

With continued reference to the accompanying figures wherein like numerals designate similar parts throughout the various views, and with initial attention directed to FIGURE 1, reference numeral 10 designates the sample member or wheel 10 having a plurality of sample blocks 12 secured along its periphery by threaded bolts 14. The sample wheel 10 which, as best shown in FIGURE 2, consists of a pair of flat discs 16 and 18 spacedly secured to an axle 20 rotatably mounted between a pair of pillow blocks 22 and 24. A drive sprocket 26 is securely attached to flat disc 16 by threaded bolts 28 extending through spacers 30.

A foot assembly wheel or member 32 is mounted immediately below the sample wheel 10 and, again as best shown in FIGURE 2, consists of a pair of flat discs 34 and 36. Ball-bearing assemblies 38 and 40 are secured to flat discs 34 and 36, respectively, to revolve about an axle 42. The axle 42 is securely mounted in support blocks 44 and 46 bolted to a frame 48 which, as shown in FIGURES 1 and 2, extends upwardly to also provide support through spacer blocks 50 and 52 for the pillow blocks 22 and 24, respectively. A drive sprocket 54 is securely fastened to flat disc 34 by threaded bolts 56 extending through spacers 58 and a plurality of foot assemblies 60 are spacedly and pivotally secured between discs 34 and 36 around the periphery of the member or foot assembly wheel 32.

As shown in FIGURES 1 and 2, axles 20 and 42 are mounted on the frame 48 in parallel relationship and spaced such that the wheels or members 10 and 32 revolve with only slight clearance therebetween. While as shown, the axle 20 is mounted directly above the axle 42, it could as well be mounted below, to one side of axle 42, or at some angle with axle 42. The only requirement is that the axles be disposed so that the wheels 10 and 32 rotate in closely spaced relationship with the flat discs 16, 18, 34, and 36 located in substantially parallel planes.

Motive power is supplied to the wheels 10 and 32 through an electric motor 62 mounted on the frame 48 and driving a sprocket 64 through a gear box 66. A conventional roller chain 68 extends partially around sprocket 64, up and across sprocket 54, partially around idler sprocket 70, across the tensioning sprocket 72, across and partially around sprocket 26, and back to sprocket 64. In this manner power is transmitted from drive sprocket 64 to sprockets 54 and 26 thereby rotate wheels 10 and 32 in substantially synchronal relationship.

Figure 4:
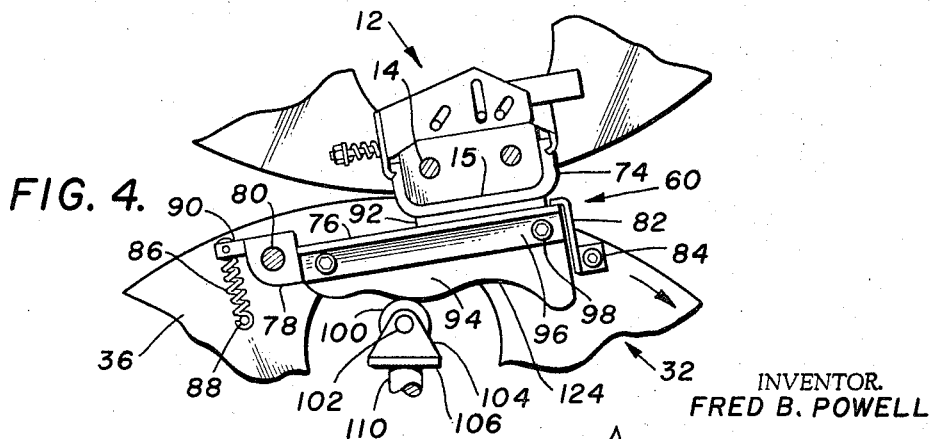
FIGURE 4 is a fragmentary view showing details of the relationship between the sample block and foot assembly according to the embodiment of the invention illustrated in FIGURES 1 and 2.

The operative relationship between the sample blocks 12 and the shoe assembly 60 of the embodiment illustrated in FIGURES 1 and 2 is best shown in FIGURE 4. Each sample block 12 is secured to wheel 10 by a pair of bolts 14 in such a manner that the outer surface 15 of the block extends perpendicular to a radius of the wheel 10. A carpet sample 74 is stretched, and held across the outer face surface 15 of the sample block in a manner to be hereinafter described.

Each shoe assembly 60 consists of an arm 76 secured to a bearing block 78 pivotally mounted on a short shaft 80 secured between the flat disc members 34 and 36 of the wheel 32. The arm 76 is biased into contact with a stop 82 adjustably secured to the disc 36 through a bolt 84, by means of a spring 86 extending between an extension 90 on the bearing block 78 and a pin 88 on the disc 36.

Mounted on the outer surface of the arm 76 is a section of material 92 similar to that found on the soles of shoes to act as a wearing surface on the sample 74. For example, this section 92 may be of neoprene, rubber, leather, or other materials commonly used in this application. This section 92 may be secured to the arm 76 in any known manner such as by the use of adhesives, rivets, nuts and bolts and so forth. A cam 94 contoured in a manner to be hereinafter described is secured to the under surface of the arm 76 in any suitable manner. As illustrated in FIGURE 4 the cam is secured by bolts 98 to a depending flange 96 welded to the arm 76.

As best illustrated in FIGURE 2, a cam follower 100 is rotatably secured on a shaft 102 in a roller block 104 which is affixed to a mounting plate 106 in any suitable manner. The mounting plate 106 is in turn secured by flat headed screw 108 to a partly hollow spring retainer 110 which is slidably mounted within a cam follower housing 112. The housing 112 is closed at its upper end by a cover 114 and is mounted at its lower end to a bracket 116 rigidly fastened to the shaft 42 by key 118 and set screw 120.

A spring 122 reacts at its lowermost end against the bracket 116 and at its uppermost end extends into the spring retainer 110 pressing against the upper surface 111 thereof. Thus, spring 122 biases the cam follower 100 into contact with the cam 94 and resists displacement of the follower toward the shaft 42. The cam follower 100 is, however, free to move within the limitations imposed on its associated spring retainer 110 by the housing 112. Since the spring 122 has a known rate (pounds per inch of displacement) the shoe sole material section 92 can be maintained in contact with the testing material 74 at a known, predetermined pressure.

Figure 9:
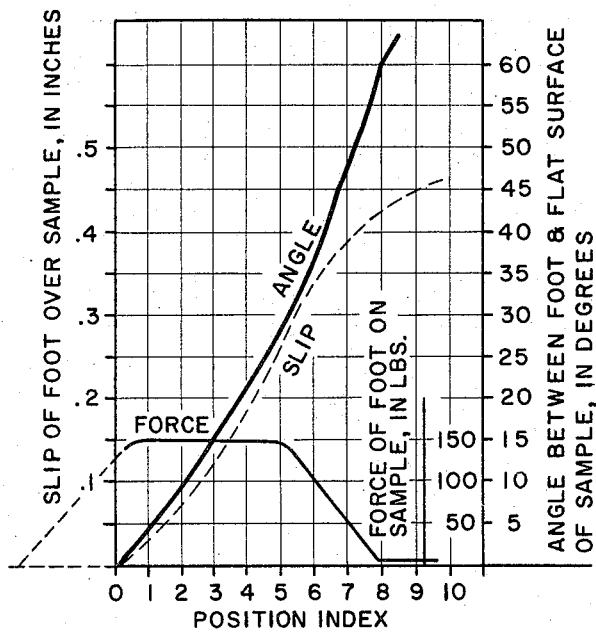
FIGURE 9 is a graph showing the relationship between force, angle of force application, and slip between the foot and sample at all positions during contact of these elements.

To determine the shape of the cam follower 94, it was first necessary to analyze the action of a foot on a stairway. As hereinbefore stated, it was found that the greater part of wear on a stair covering occurred during the descent of traffic thereon. The forces produced by a shoe impacting on the surface during stair descent were analyzed and found to be as follows. The shoe first impacts on the surface at substantially zero angle and at only slightly less than maximum force. Thereafter, the force increases to a maximum and the angle between the shoe and the surface covering increases gradually as the shoe rolls around the stair edge. At the same time the foot slides across the surface. As the foot begins to leave the particular stair step, the force thereon decreases to a minimum, the angle of foot to surface increases to a maximum and the rate of slip slows to a minimum. These various relationships are shown in FIGURE 9 which is an illustration of the relationship between force, angle of force application, and amount of slip between foot and sample as produce on the testing machine.

In order to explain the manner in which the cam 94 profile is determined, the operation of the testing machine must first be understood. Referring to FIGURES 1 and 4 assuming that the diameters of wheels 10 and 32 are equal, it is seen that the orbital path of the sample 74 mounted on the sample block 12 about the axle 20 will be longer than that of the shoe sole section 92 about the axle 42. These orbital paths and their distance from their associated centers (coinciding with axles 20 and 42) are related in a manner such that they will overlap to a significant degree to either side of a line passing through axles 20 and 42 and, thus, the point at which wheels 10 and 32 are closest. Since the sample blocks 12 are immovably secured to the sample wheel 10 they will force the shoe assemblies 60 away from the stop 82 to pivot downwardly about the shaft 80 against the spring 122 (see FIGURE 2). The downward pressure exerted by the action of sample block 12 and the resistance offered by spring 122 simulate the pressure exerted by a foot on a step.

As explained above, the shoe pressure is not constant as the foot passes onto, across, and away from the step.

The cam 94 must, therefore, be contoured to reflect this variation.

Figure 8:
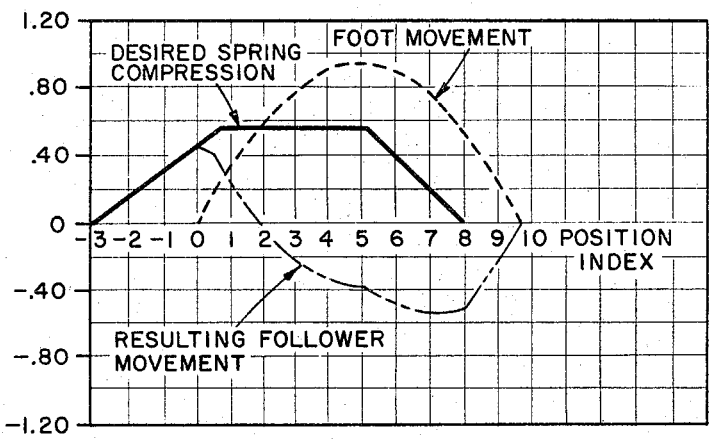
FIGURE 8 is a graph in which the foot movement, desired spring compression, and resulting follower movement are plotted against a position index.

Utilizing a graph similar to that shown in FIGURE 8, the desired follower movement can be determined and, in accordance with well known mechanical engineering concepts, the cam profile ascertained. As shown in FIGURE 8, beginning at the point of contact or zero position index, an arbitrary unit representing 3¾° of rotation, the foot assembly arm 76 and material section 92 are gradually moved under the influence of the sample block 12 downwardly a distance to simulate the application of foot pressure and then back to its normal position as the sample moves therefrom. In order to produce the force curve illustrated in FIGURE 9, the spring must be compressed along a similar curve as shown in FIGURE 8. To do this the difference between the force produced as a result of the sample block depressing the shoe 60 and, the force produced as a result of the motion of the follower 100 over the surface of the cam 94 must be maintained constant between approximately positioned index .5 and position index 5. In other words, as the force produced by the depression of the shoe assembly 60 by the sample block 12 increases the cam must be contoured to decrease its compressive action on the spring as shown by the negative values on the curve of FIGURE 8 labeled "Follower Movement." These negative values are reflected in the portion of the cam shown at 124.

In relating FIGURES 8 and 9 to FIGURE 4, the shoe assembly 60 and sample block 12 are shown at approximately the point of contact or zero position index. At that time the follower 100 is compressing the spring 122 a maximum amount and the sample block 12 is exerting virtually no force at all thereon. Thereafter, the sample block 12 begins to move the shoe assembly 60 downwardly against the action of the spring 122, a force which must be balanced by reducing the influence of the cam follower 100 on the spring 122. This results in the aforementioned curve 124. As the sample block 12 begins to leave the foot assembly 60, or approximately positioned at index 5, its influence on the spring 122 is reduced. It is not, however, desirable at this time to maintain the foot pressure (and hence compress the spring) because in actual foot movement the force of a shoe of the stair surface is decreasing as most clearly shown in FIGURE 9. Thus, force or spring compression is allowed to slowly return to a relaxed state at position index 8 to reflect the fact that the shoe is leaving the step.

Referring to FIGURES 8 and 9, it is seen that the compression of the spring and hence the force between foot and sample is reduced from position index 5 to 8. This portion of the cycle represents that time when the shoe is rolling across the edge of a stair step under a condition of reduced force, reduced slip rate, but at an increase in angle of force application. From position index 8 to 10 the sample block is leaving the foot assembly and the follower 100 is moving upwardly along the cam 94 surface as the arm 76 is returned to position against the stop 82 under the influence of the spring 86. The spring 122 is not compressed by this follower movement, however, since by the rotation of wheel 32 the surface of cam 94 is actually tending to move away from the follower 100 at approximately the same rate of follower movement.

By an analysis similar to FIGURE 8 a desired cam profile can be determined in a manner well known in the art. The shape of the cam shown in FIGURE 4 is a reflection of such an analysis and was obtained in the aforedescribed manner.

As was discussed above, assuming that the diameters of wheels 10 and 32 are equal, the orbital path of the sample 74 as mounted on its associated sample block 12 will be longer than that of the shoe assembly 60. Thus, if the angular velocities of wheels 10 and 32 are equal, the linear speed of sample 74 and its associated sample block 12 will be greater than that of the shoe assembly 60. For this reason, as shoe assembly 60 and testing sample 74 contact one another, the sample will slide across the surface of the section 92 of shoe sole-like material. Obviously, the synchronism of the two wheels is affected by angular velocity only, not the relative linear velocity of the shoe assembly 60 and the sample blocks 12.

In the embodiment of the invention illustrated in FIGURES 1 and 2 there are seven sample blocks 12 on wheel 10 and only six shoe assemblies on wheel 32. Since seven sample blocks must be spaced around the wheel 10 rather than six, the angular distance between them is less than the angular distance between shoe assemblies 60 on wheel 32. To maintain the same circumferential distance between sample blocks 12 as between shoe assemblies 60 it is necessary to increase the radius of wheel 10 in relation to that of wheel 32. Synchronism between sample blocks 12 and shoe assemblies 60 is maintained by reducing the angular velocity of wheel 10 relative to that of wheel 32 since in traveling the same circumferential distance the angular rotation of wheel 10 is less than that of wheel 32. This angular velocity relationship is achieved by utilizing sprocket drives 26 and 54 having different numbers of teeth thereon in a well known manner. For example, if sprocket wheel 54 has 42 teeth around its periphery, sprocket wheel 26 should have 49 or, in other words, seven teeth on sprocket 26 for every 6 teeth on sprocket 54. Increasing the radius of wheel 10 over that of wheel 32 while decreasing its angular velocity relative to wheel 32 maintains the relative linear speed differential between sample blocks 12 and shoe assemblies 60 and, hence, relative sliding motion as discussed above.

Figure 3:
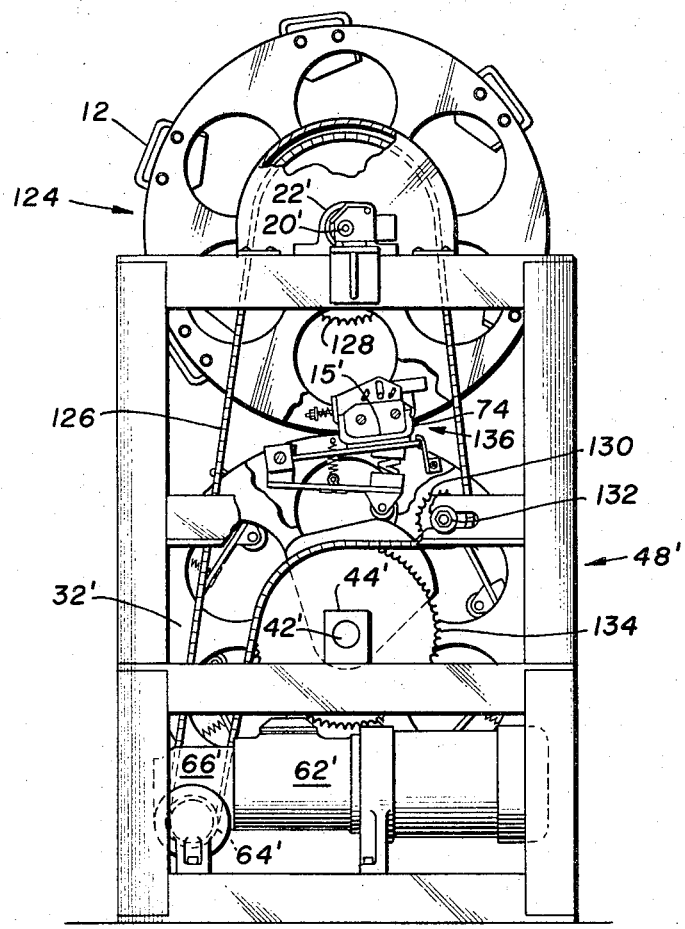
FIGURE 3 is a side view similar to FIGURE 1 but showing an embodiment of the invention in which the number of sample blocks equals the number of foot assemblies and in which the cam is secured to the foot assembly wheel axle and the follower is secured to a foot assembly.

In the embodiment of the invention illustrated in FIGURES 3 and 5, there are 6 sample blocks 12 on the sample wheel 124 and 6 shoe assemblies mounted on the shoe assembly wheel 32'. The diameters of wheels 32' and 124 are equal and they are driven at the same angular velocity. As in the embodiment illustrated in FIGURES 1 and 2, the orbital path of the sample 74 mounted on sample block 12 is longer and has a radius about axle 20' greater than that of the shoe assembly about axle 42'. This, as discussed above, provides for slip during contact of sample 74 with the shoe.

In many respects the testing assembly of the embodiment of FIGURE 3 is identical to that shown in FIGURES 1 and 2. The wheel 124 consists of two flat discs similarly to wheel 10 as does wheel 32' similarly to wheel 32. Both wheels are mounted on a frame 48' on spaced parallel axles 20' and 42'. Sample wheel 124 rotates with axle 20' in a pair of pillow blocks (22' only shown) while shoe wheel 32' rotates about axle 42' secured in a pair of support blocks (44' only shown). Motive force is provided by a motor 62' driving a sprocket 64' through a gear box 66'. The sprocket 64' in turn drives a chain 126 which extends around and across sprocket 128, across idler sprocket 130 attached to the frame by the nut and bolt assembly 132, across sprocket 134, and partially around drive sprocket 64'. Sprockets 128 and 134 have equal numbers of teeth to thereby provide the same angular velocity to both wheel 124 and wheel 32'. It will also be noted that the sample holding blocks 12 are identical to those illustrated in FIGURES 1, 2, and 4.

As most clearly shown in FIGURE 5 there are substantial differences in the manner in which the shoe assembly 136 of the embodiment of FIGURE 3 is constructed when contrasted with the shoe assembly 60 of the embodiment of FIGURES 1, 2, and 4. Like that embodiment, shoe assembly 136 consists of an arm 138 secured to a bearing block 140 pivotal about a shaft 80 mounted between the discs of wheel 32'. A section of shoe sole-like material 92' is secured on the upper surface of the arm 138 while a spring retaining cup 142 is secured on its lower surface. A second bearing block 144 is pivotally mounted on the shaft 80 and is secured to a second arm 146. Spring retaining cup 148 is affixed on the upper surface of the second arm 146 while a roller block 150 is fastened to its lower surface and mounted approximately in line with the spring retaining cups 142 and 148. Shaft 152 extending through the mounting block 150, rotatably holds a cam follower 154. A retaining spring 156 is secured at one end by a cotter pin 158 and at its other end is hooked around a dowel pin 160 mounted on the wheel 32'. This retaining spring 156 limits the downward travel of the arms 138 and 146 and maintains the spring mounting cups 142 and 148 within predetermined travel limits so that a foot pressure spring 162 may be retained therebetween. An outwardly extending cam 164 is fixedly secured to the axle 42' which like axle 42 does not rotate.

The operation of the shoe assembly 136 is very much similar to that of shoe assembly 60 in that as the sample block 12 rotates with wheel 124 and contacts the sole-like material 92 it pushes the arm 138 downwardly away from the stop 82 against the resistance of foot pressure spring 162. Thus, the force exerted between material section 92' and the sample 74 consists of the resistance of the spring 162 to compression as well as the force exerted on the spring 162 by the cam through cam follower 154. As in the spring 122 shown in FIGURE 2, the rate of spring 162 is known and, therefore, a predetermined force can be applied simply by manipulation of the cam surface.

The contour of the cam 164 is determined in the same manner as that explained with regard to FIGURE 8. Since the desired follower movement is known, the cam profile is determinable by reference to well known mechanical engineering principles. The cam contour illustrated in FIGURE 5 reflects a determination made with references to FIGURE 8.

Throughout the above description, this novel testing apparatus has been described with springs utilized as biasing devices. It is to be understood, however, that other mechanisms can also perform this function. For example, appropriately controlled pneumatic or hydraulic systems will produce satisfactory results in this regard.

While shoe assembly 136 has been explained in conjunction with the particular arrangement shown in FIGURE 3 and shoe assembly 60 has been explained in connection with the embodiment illustrated in FIGURES 1 and 2, these shoe assemblies are interchangeable. The only particular advantage of one assembly over the other lies in the use of one spring in the embodiment of FIGURES 1, 2 and 4 rather than six springs in the embodiment of FIGURES 3 and 5. Thus, the spring to spring rate variables normally associated with these devices is minimized.

The sample block 12 of both the embodiment of FIGURES 1, 2, and 4 and the embodiment illustrated in FIGURES 3 and 5 is shown in FIGURES 6 and 7. This sample block consists of a block 166 of a relatively hard material such as steel or aluminum having rounded corners 168 simulating the edge of a stair step and a flat outer surface 15. A pair of threaded apertures 170 are formed in the side of each block to receive the aforedescribed securing bolts 14. Four slotted pins 172, 174, 176, and 178 are suitably secured to the sides of block 116 and extend outwardly thereof. A first U-shaped member 180 is disposed around a portion of the block 166 and includes a pair of slanted, parallel, elongated slots 182 and 184 cut in both of its outwardly extending arms. These slots are arranged to slidably receive the slotted pins described above. The arms of the U-shaped member 180 also include an elongated, vertically extending slot 186 disposed between slanted slots 182 and 184.

A second U-shaped member also partially encloses the block 166 and includes slanted, parallel, elongated slots 190 and 191 in each of its outward extending arms slidably receiving the slotted pins described above. Slots 190 and 191 are constructed to extend substantially perpendicular to slots 182 and 184. The arms of U-shaped member 188 are spaced from and disposed inwardly toward the block 166 in overlapping relationship with the arms of U-shaped member 180. The bottoms of U-shaped members 180 and 188 are disposed on opposite ends of block 166.

A third U-shaped member 192 has arms extending between those of U-shaped members 180 and 188 with its bottom portion extending outwardly of the bottom portion of U-shaped member 188 to form a readily grippable handle. A pair of first pivot pins 194 are secured to the third U-shaped member 192 and extend inwardly into apertures 196 in the arms of second U-shaped member 188 in which sufficient clearance is provided to allow relative rotation. Disposed on upwardly extending portions 198 on each arm of the third U-shaped member 192 are second pivot pins 200 which extend outwardly into the vertical slots 186 in the first U-shaped member 180.

The bottom portion of U-shaped member 188 extends above its associated arms and curves inwardly to terminate in a point 202. Disposed across the bottom of first U-shaped member 180 is a plate 204 which also curves inwardly to terminate in a point 206 directly across block 166 from the point 202. The plate 204 is slidable on threaded studs 208 secured in U-shaped member 180. A pair of compression springs 210 surround studs 208 and react between a pair of washers 212 bearing against plate 204 and a washer 214 bearing against a pair of nuts 216 threaded onto the outer ends of studs 208 to resiliently force the plate 204 into contact with the U-shaped member 180 and the point 206 toward the end of block 166.

The sample blocks 12 illustrated in FIGURES 6 and 7 are shown in their operative closed position in which, normally, a carpet sample 74 would be stretched across the outer surface 15 and around curved portions 168 of the blocks 166. The sample would be firmly held in this position by gripping it between the points 202 and 206 and the opposed ends of block 166. To release the carpet samples the handle formed on the third U-shaped member 192 would be moved in the direction of the arrow in a downward motion pivoting it first about pin 194. This downward pivoting motion would force pin 200 down and along slot 186 forcing the U-shaped member 180 to move upwardly and to the right, as viewed in FIGURE 7, as the pins 172, 174, 176, and 178 ride along slots 182 and 184. When the pin 200 reaches the bottom of slot 186 it becomes the pivot point for U-shaped member 192 as its indicated movement is continued. As this occurs, pivot pin 194 forces the second U-shaped member 188 up and to the left, again as viewed in FIGURE 7. Thus, in its fully open position points 202 and 206 will be elevated from the position illustrated in FIGURE 7 and disposed outwardly from the opposite ends of sample block 166. It is seen, therefore, that a carpet sample may be positioned on outer face 15 with its ends extending over curved surfaces 168 and down along the ends of the sample block 166. Then as the handle is moved to the closed position, points 202 and 206 will move inwardly toward one another and downwardly to thereby stretch the sample across face 15 and grip it securely in the desired position. The resilient mounting of plate 204 allows for differences in thicknesses in carpet samples and also as a "safety valve" for preventing points 202 and 206 from gripping the carpet samples so tightly as to cut them.

An overthrow latching feature is incorporated in the sample block 12 to maintain points 202 and 206 securely in the closed position. This latching is accomplished by locating pivot pins 194 and 200 off line with respect to pins 172 and 174 and each other. The clamping mechanism is fully closed when pin 200 reaches a position directly opposite and aligned with pivot pin 194. At that time pins 172 and 174 have reached their upper limits of travel in slots 182, 184, 190, and 191, and springs 210 are compressed. Continued movement of pin 200 around pivot 194 actually moves the U-shaped member 180 slightly toward the open position but, at the same time, locks U-shaped member 192 in position with pivot pin 200 above pivot pin 194. Movement of U-shaped member 180 away from a closed position is compensated for by plate 204 which moves toward block 166 under the influence of springs 210. The latter elements also perform a part of the locking function by aiding in maintaining pin 200 in its off line position.

It will be apparent from the foregoing description that testing apparatus which will accurately reproduce the environment of a surface covering, such as a carpet, on a stair step has been devised. Heretofore, surface covering testers were limited either to impact alone or impact and abrasion testing. The instant invention, however, reproduces not only impact and abrasion forces but slip as well as roll forces to which a surface covering is subjected when installed on a stairway. Thus, it becomes possible for the first time to check the wearing properties of a surface covering to be installed on a stair step without actually installing it in the environment in which it is to be used. Tests which were formally laborious, lengthy, and produced non-uniform results can now be performed easily, quickly, and under uniform conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Testing apparatus for determining the wearing qualities of a surface cover mounted on a stairway comprising:
    (a) a first member rotatable about a first axle;
    (b) a second member rotatable about a second axle;
    (c) said axles being mounted in spaced, parallel relationship such that said first member is closely spaced from said second member;
    (d) mounting means secured to said first member for removably holding surface covering material test samples;
    (e) stressing means mounted on said second member;
    (f) said means for holding a test sample and said stressing means being secured to said first and second members respectively at a distance from said first and second axles such that the orbital path of at least one of said means is longer than, and overlaps the orbital path of the other of said means whereby the linear velocity of said stressing and holding means will be unequal as said first and second members rotate;
    (g) means for rotatably driving said first and second members in substantially synchronal relationship whereby said test samples and stressing means will be moved along said orbital paths and brought into sliding contact with one another at the point at which said orbital paths overlap; and
    (h) means for forcing said test sample and said stressing means together at a predetermined, controlled pressure whereby the impact wear created by traffic on a carpeted stair can be simulated.

2. Apparatus according to claim 1 wherein said stressing means includes:
    (a) an arm pivotally secured to said second member and biased toward said first member;
    (b) an adjustable stop secured proximate said arm and positioned to limit the travel of said arm toward said first member; and
    (c) friction and abrasion producing materials secured to the outer face of said arm and adapted to contact said material.

3. Apparatus according to claim 2 wherein said mounting means includes:
    (a) a plurality of blocks secured to said first member at the same radial distance from and equally spaced around said first axle;
    (b) a clamp on each of said blocks for removably gripping a material sample and holding it across the outer face of its associated block.

4. Apparatus according to claim 3 wherein:
    (a) a plurality of said pivotally mounted arms are secured to said second member at the same radial distance from, and equally spaced around said second axle.

5. Apparatus according to claim 4 wherein the orbital paths of said blocks and pivoted arms overlap whereby as material samples on said blocks contact said friction and abrading surfaces on said pivoted arms, said arms will be forced toward said second axle to thereby apply pressure to said stressing means.

6. Apparatus according to claim 5 wherein said means for forcing said test sample and said stressing means into contact includes:
    (a) a stationary cam follower on said second axle;
    (b) a cam secured to said pivotally mounted arm;
    (c) means on said second axle for biasing said cam follower into contact with said cam;
    (d) said cam being contoured to simulate the action of a foot on a carpet stair step by forcing said friction and abrasion producing surface on said arm into contact with said sample under an increasing pressure followed by a constant pressure and a decreasing pressure.

7. Apparatus according to claim 5 wherein said means for forcing said mounting and stressing means together includes:
    (a) a stationary cam mounted on said second axle;
    (b) a cam follower pivotally secured to said second member proximate each of said pivotally mounted arms;
    (c) means on said cam follower and pivoted arm for biasing said cam follower into contact with said cam and for resisting movement of said pivoted arm toward its second axle;
    (d) said cam being contoured to simulate the action of a foot on a carpeted stair step by forcing, through said follower and said means for biasing, said friction and abrasion producing surface on said arm into contact with said sample under an increasing pressure followed by a constant pressure and a decreasing pressure.

8. Apparatus according to claim 6 wherein there is at least one more block on said first member than pivoted arm on said second member.

9. Apparatus according to claim 7 wherein the number of blocks is equal to the number of pivoted arms.

10. Apparatus according to claim 5 wherein said clamp includes:
    (a) a first shaped member secured to said block for movement at an acute angle toward and away from a first end of said block adjacent said outer surface;
    (b) a second, shaped member secured to said block for movement and an acute angle toward and away from a second end of said block adjacent said outer surface and opposite said first end;
    (c) said first and second shaped members each having a pointed portion extending toward its associated end; and
    (d) means for moving said first and second members away from said ends and toward a plane passing through said outer surface whereby a sample of surface covering material can be received, and toward said ends and away from said plane whereby a sample of surface covering material can be stretched across said outer surface.

References Cited

UNITED STATES PATENTS 3,323,349   6/1967   Savage et al. _____ 73—7

LOUIS R. PRINCE, *Primary Examiner.*

J. NOLTON, *Assistant Examiner.*